US012769539B2

(12) United States Patent
Sinha et al.

(10) Patent No.: US 12,769,539 B2
(45) Date of Patent: Oct. 20, 2026

(54) VIRTUAL SLOT FOR FIRMWARE IMAGE

(71) Applicant: Micron Technology, Inc., Boise, ID (US)

(72) Inventors: Gaurav Sinha, Unterschleißheim (DE); Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 247 days.

(21) Appl. No.: 18/790,892

(22) Filed: Jul. 31, 2024

(65) Prior Publication Data

US 2026/0037252 A1 Feb. 5, 2026

(51) Int. Cl.
*G06F 8/654* (2018.01)

(52) U.S. Cl.
CPC .................................... *G06F 8/654* (2018.02)

(58) Field of Classification Search
CPC ... G06F 8/63; G06F 8/65; G06F 8/654; G06F 9/4405; G06F 11/1417; G06F 11/1435
See application file for complete search history.

(56) References Cited

U.S. PATENT DOCUMENTS

| | | | | |
|---|---|---|---|---|
| 12,020,021 | B2 * | 6/2024 | Ansari | G06F 8/656 |
| 12,265,831 | B2 * | 4/2025 | Huang | G06F 12/0246 |
| 12,423,090 | B2 * | 9/2025 | Mavungal Noorudheen | G06F 8/654 |
| 2008/0256525 | A1 * | 10/2008 | Ellsworth | G06F 11/1433 717/168 |
| 2014/0033187 | A1 * | 1/2014 | Beale | G06F 8/656 717/168 |

* cited by examiner

*Primary Examiner* — Marina Lee
(74) *Attorney, Agent, or Firm* — Schwegman Lundberg & Woessner, P.A.

(57) ABSTRACT

Devices and techniques that provide a virtual slot for firmware images are described herein. A device includes a controller configured to execute a firmware image; erasable programmable read-only memory to store firmware images; and memory including instructions, which when executed by the controller, cause the controller to: store a temporary firmware image into a firmware memory, the temporary firmware image to be used in place of a current firmware image; receive a parameter to control the use of the temporary firmware image, the parameter defining a condition; store the parameter in the local memory; activate the temporary firmware image in the virtual firmware slot; and use the temporary firmware image until the condition is satisfied, and then revert to the current firmware image.

20 Claims, 5 Drawing Sheets

VIRTUAL SLOT FOR FIRMWARE IMAGE

BACKGROUND

Memory devices are typically provided as internal, semiconductor, integrated circuits in computers or other electronic devices. There are many diverse types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

To easily identify the discussion of any particular element or act, the most significant digit or digits in a reference number refer to the figure number in which that element is first introduced.

DETAILED DESCRIPTION

Figure 1:
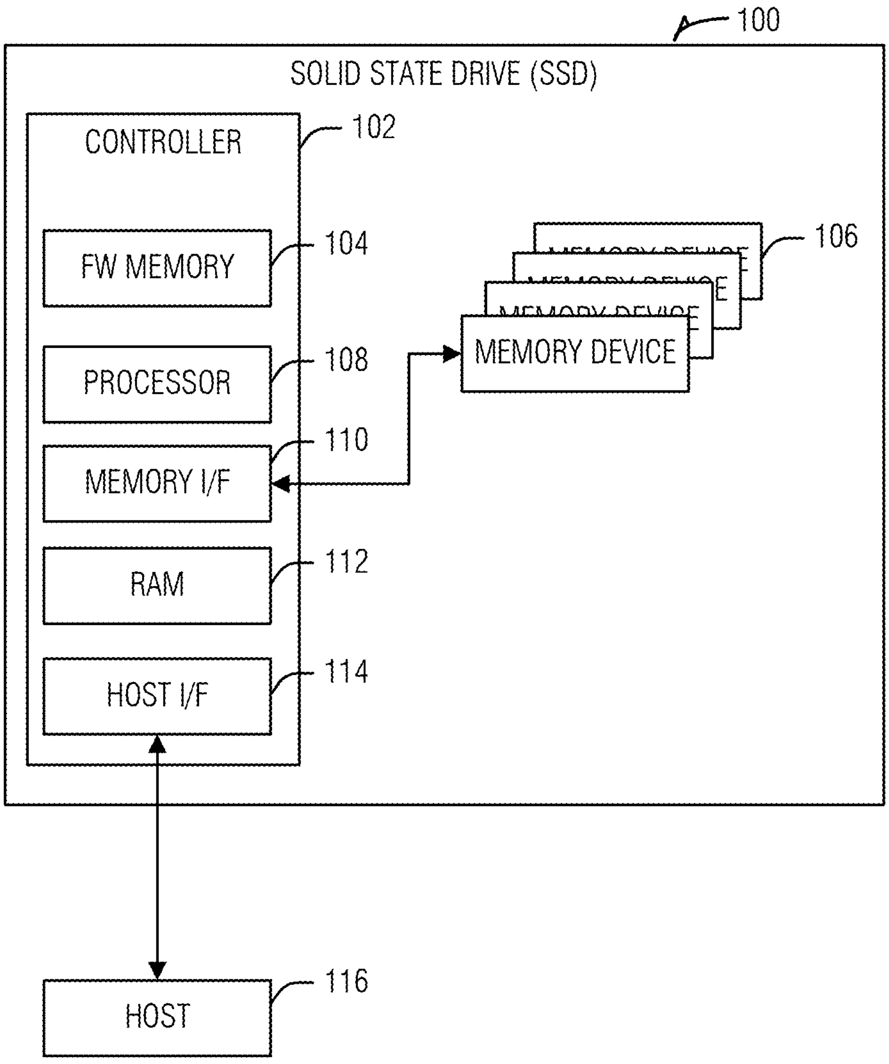
FIG. 1 is a block diagram illustrating a solid state drive (SSD) architecture, according to an embodiment.

Aspects of the present disclosure are directed to using virtual slots for firmware images. Firmware (FW) is software that is used for low-level control of hardware components, such as video cards, hard disk drives (HDD), solid state drives (SSD), processors, interface hubs, network interface devices (NID), and the like. Each hardware component includes one or more device controllers. Firmware is stored in memory accessible by a device controller. In conventional implementations, FW is stored in non-volatile memory. The FW is used by the controller to program its operation at each power cycle (e.g., boot). Firmware may be updated by the host system.

SSD uses a FW slot to store the FW image. To apply a new FW to the SSD, the operations involve downloading the FW into the slot and then activating the slot. Once the FW image is downloaded to the FW slot, it stays persistent on the SSD across the power cycles. However, in some situations it would be advantageous to only have the FW be used in a limited number of power cycles before regressing to the previous FW version. In these situations, instead of using a known FW slot, the systems and methods described herein provide for a virtual FW slot. This virtual FW slot is configured for use for a limited number of power cycles before being discarded. The virtual FW slot may not be implemented like other conventional FW slots. For instance, the virtual FW slot may not share the same memory space or even the same memory device, as a conventional FW slot.

By using a virtual FW slot, a customer (e.g., a FW developer, end user, testing user, field inspector, or other person) may check for compatibility issues by downloading the FW under qualification to the virtual FW slot. Once the customer is satisfied with the performance of the FW under qualification, they can proceed to download the FW to a regular FW slot.

Temporary FW may be used to recover latent errors. For instance, a bug in existing FW may affect NAND calibration and cause overrun in certain workloads. Even though the FW fix may be performed easily by correcting the algorithm to account for the corner situation, the damage on existing NAND blocks is already done. So, to remove these latent errors, a process is implemented to recalibrate the impacted block. This process only needs to be run once for each effected block. In absence of a virtual FW slot that allows for temporary FW, the recovery algorithm would need to be included in the main FW. The main FW size may be constrained by issues like an increased code size may not be able to fit in an existing slot, thereby increasing validation cost due to the added complexity. The use of a virtual FW slot reduces FW complexity, validation costs, and possibilities for new FW bugs. The temporary FW may be simpler than the main FW thereby reducing the cost to validate the latent error recovery fix. A temporary FW image may be downloaded to the virtual FW slot, activated, and then executed to address the latent errors. After the temporary FW is executed, then the temporary FW may be removed and the previous main FW image is reactivated.

Temporary FW is also useful to address potential compatibility issues that result in system failure (e.g., boot failure, enumeration issue, incompatibility due to changes in the number of queues, etc.) when testing or upgrading FW. An implementer is able to download the temporary FW to the virtual FW slot and execute the temporary FW for validation. By limiting the number of power cycles or restarts that the temporary FW is active, the implementer is able to test the temporary FW without worrying about bricking a system. This is especially useful when the SSD is permanently mounted onto the platform (e.g., ball grid array (BGA) form factor) and is therefore not easily replaceable in the field.

The present systems and methods described herein provide for a virtual FW slot. A user may implement the virtual FW slot to activate and use temporary FW for a device. The FW is loaded from the virtual FW slot until a condition is met. Once the condition is met, then the main FW is reactivated and loaded at the next platform restart. Additional details are set forth below.

FIG. 1 is a block diagram illustrating a solid state drive (SSD) architecture 100, according to an embodiment. The SSD architecture 100 includes a controller 102, firmware memory 104, memory devices 106, and a host interface 108. The controller 102 acts as the bridge between the host computer 116 and the memory devices 106. The controller 102 is an embedded processor that is programmed by firmware (FW). The controller 102 manages various operations on the memory devices 106 including wear leveling, bad block mapping, read and write operations, encryption, error detection, garbage collection, calibration, and the like. The controller 102 includes one or more processors 108, a memory interface 110, random access memory (RAM) 112, and a host interface 114 to interface using protocols such as SATA, USB, and NVMe. The memory interface 110 is used to handle read and write operations to the memory devices 106. The RAM 112 is used as working memory for the controller 102 and may store intermediate data, instructions, pages or blocks of the memory devices 106 as cache, and the like.

The memory devices 106 are used to store data for the host computer 116. These memory devices 106 may be volatile or non-volatile memory. Flash memory is often used for memory devices 106, although DRAM is also used in some implementations. Flash memory provides for non-volatile storage at a relatively low cost while DRAM provides for very fast data access at a higher cost and volatile storage. The memory devices 106 may be non-volatile memory that can provide persistent data storage using NAND flash memory.

The controller 102 uses FW that is stored in either the FW memory 104 or the memory devices 106. The FW memory 104 may be read-only memory (ROM) or a programmable ROM, such as a EPROM or EEPROM. Reprogramming FW that is stored in ROM requires physically changing the ROM chip. Programmable memory may be reprogrammed through the controller 102. The reprogramming is also referred to as “flashing” the FW.

During operation, the host computer 116 issues read or write commands through the host processor (not shown). These commands are transferred via the host interface 108 to the controller 102. The controller 102 then performs operations on the memory devices 106 based on the commands. The operations the controller 102 uses for a given command is controlled by the FW the controller 102 is executing. When a person wants to reprogram the FW, a FW slot is identified, the FW image is downloaded from the host computer to the FW slot that was identified, and various integrity, validity, attestation, or other checks may be performed to ensure that the FW image was successfully and completely downloaded.

In a controller 102 that uses a single FW slot, the reprogramming overwrites the existing main FW and at the next restart, reboot, or power cycle, the reprogrammed FW is loaded into the controller 102. In a controller 102 that uses two FW slots, there is one that is active (the one that used the FW that is currently executing) and one that is inactive. When a FW reprogramming occurs, the inactive FW slot is selected for reprogramming. The user may select which version of FW to execute (previous version or reprogrammed version) on the next restart.

In the present systems and methods, a virtual FW slot is implemented. The virtual FW slot may be used to store temporary FW that is intended to use for a limited number of restarts, power cycles, or reboots. After the condition is fulfilled, the temporary FW is discarded. The temporary FW may be deleted after the condition is fulfilled. The temporary FW may be stored in the FW memory 104 or the memory devices 106, depending on the implementation.

Figure 2A:
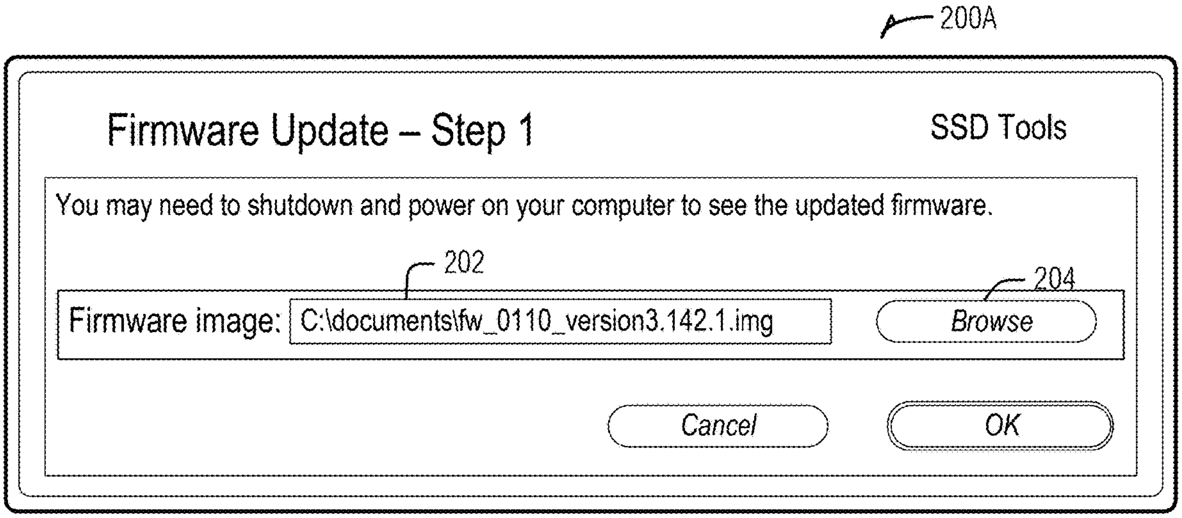
FIGS. 2A-2B are user interfaces illustrating firmware programming dialogs of a firmware loading tool, according to embodiments.
Figure 2B:
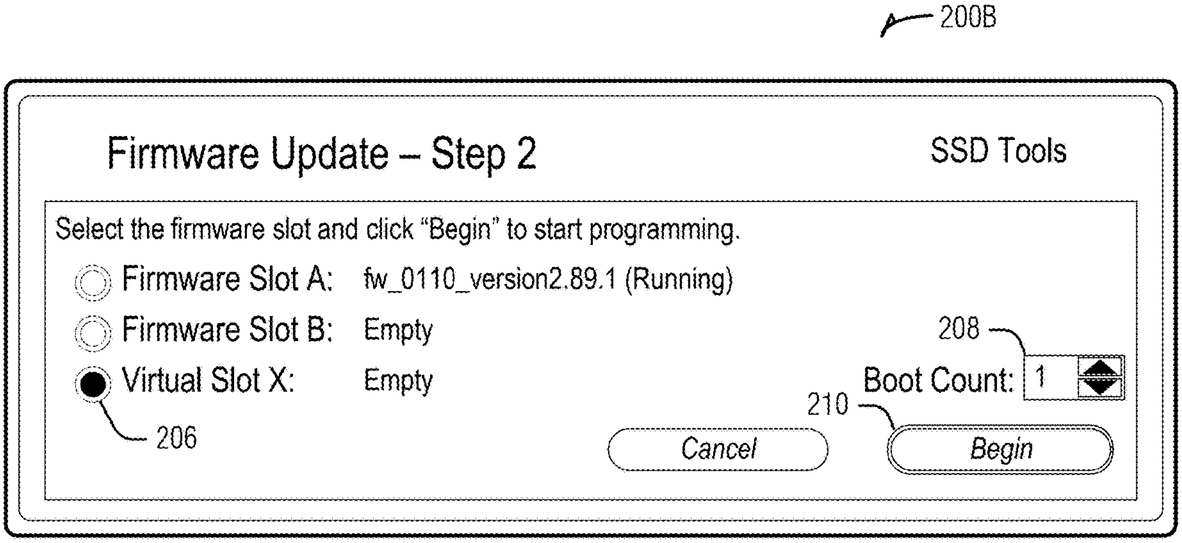

FIGS. 2A-2B are user interfaces 200A, 200B illustrating FW programming dialogs of a FW loading tool, according to embodiments. A user may download or otherwise receive a copy of a FW image to reprogram a device. In FIG. 2A, the user is prompted for a file location of the FW image. The file location may be on a local system or on a network storage device. The user may input a path and filename in the text input control 202 or browse for the file using the browse control 204. Once the FW file that contains the image is identified, it may be validated using a variety of mechanisms, such as by analyzing a digital signature that is included with the FW file. Optionally, the FW image may be in binary format. The FW image may be validated using a separate software process that performs a hash on the FW image, for example.

In FIG. 2B, after the FW file has been validated, then the user is prompted to indicate which FW slot is to be used. The user may select one of the FW slots using the corresponding radio button controls 206. In the example illustrated in FIG. 2B, there are two regular FW slots: “Slot A” and “Slot B”. Additionally, the user may select the virtual FW slot, “Slot X”, and if so, then may also indicate the number of times that the device is to use the FW loaded in the virtual FW slot before returning to the previously active FW slot. The user may increase or decrease the counter control 208. Once the user is ready, then the user may initiate the FW download to the device using the program control 210.

The FW loading tool is then configured to transmit commands to the device controller of the device being flashed to install the FW image and use the newly installed FW image for the indicated number of restarts. The FW loading tool changes the active FW slot to the temporary virtual FW slot.

Firmware downloading may be implemented using a FW download command to a PCIe NVMe SSD. The FW download command is used to transit/write the FW image to the SSD. Updating a PCIe NVMe SSD with a new FW is a two-step process. In a first step, the FW image is written to the SSD using the FW Image Download command. Based on the size of the FW image, the FW Image Download command may be required to be sent to the SSD. In the second step, once the complete FW image has been downloaded, the FW Commit command is issued to tell the SSD to active the FW slot in which the FW has been downloaded.

In response to the commands, the device controller stores the FW image to a specified location, stores the previous active FW slot, initializes a counter variable, and after a warm reboot, restart, or power cycle, checks the counter variable, decrements it, and uses the newly installed FW from the virtual FW slot if the counter variable is greater than zero. If the counter variable is zero, then the active FW slot is changed back to the previously active FW slot and the image in that slot is loaded.

Figure 3:
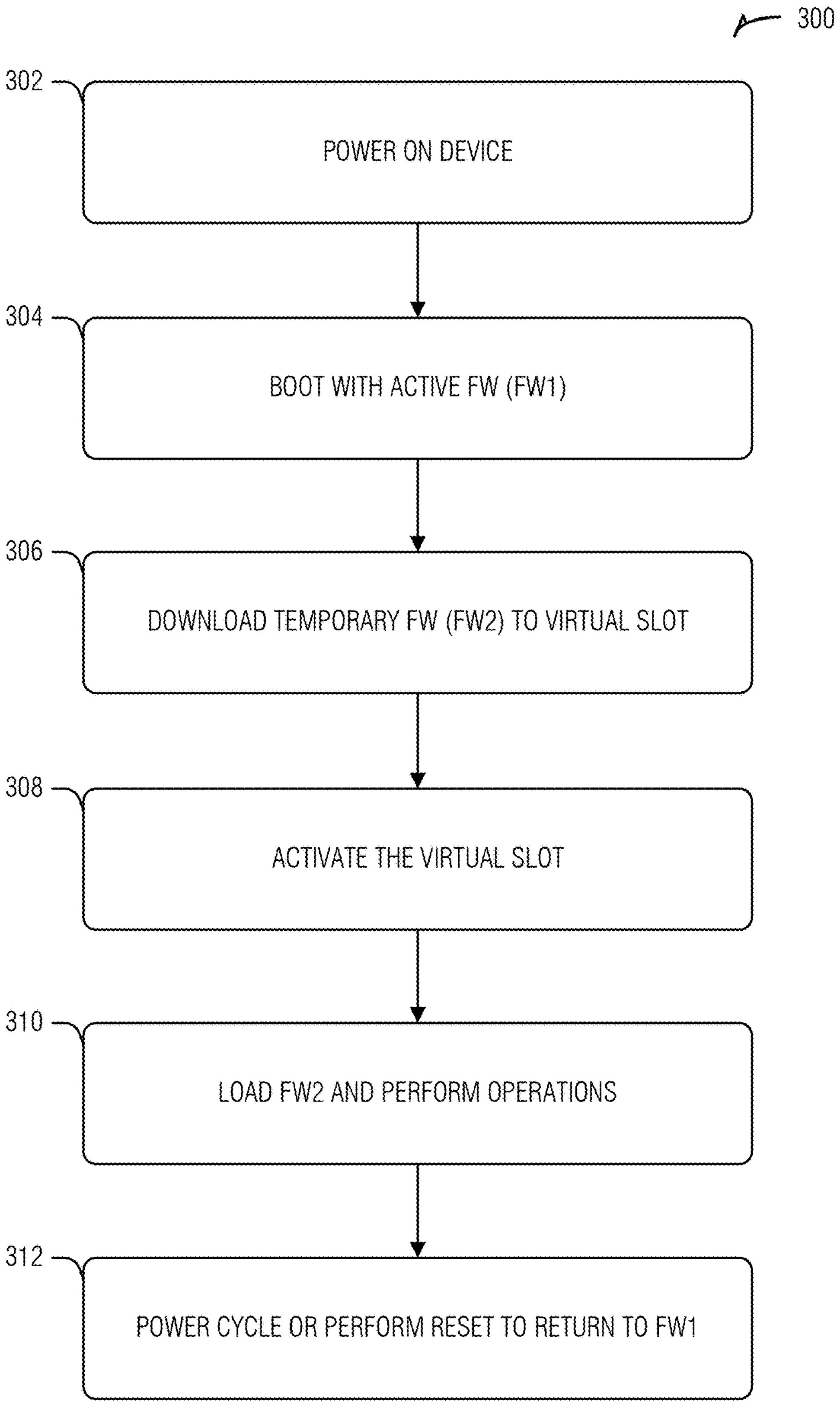
FIG. 3 is a flowchart illustrating an example method for temporary firmware reprogramming, according to an embodiment.

FIG. 3 is a flowchart illustrating an example method 300 for temporary FW reprogramming, according to an embodiment. At operation 302, the SSD is powered on. At operation 304, the SSD boots with the active FW, which is already installed in one of the slots. At operation 306, the temporary FW is downloaded to the virtual slot. At operation 308, the virtual slot is activated and remains active until a condition is met. The condition may be a certain number of power cycles or a fundamental reset (e.g., factory reset). At operation 310, the temporary FW executes and performs operations. A human operator may observe and test the SSD while the temporary FW is loaded to ensure that the bugs are fixed, that the temporary FW is compatible with the SSD, that enhancements or other changes to the FW are working correctly, or the like. At operation 312, once the desired operations are completed, the host can power cycle the SSD or perform a fundamental reset to get back to the previously active FW. In implementations that use a counter variable, then in situations where the counter variable is set to be greater than one, more than one power cycles, fundamental resets, warm reboots, etc. may be used before the FW is reset back to the previously active FW.

It is understood that although several examples in this discussion revolve around reprogramming FW for SSD devices, other devices such as network interface cards (NIC), network interface devices (NID), routers, modems, processors, audio cards, video cards, and the like may also be configured to use a temporary or virtual FW slot as discussed herein.

Figure 4:
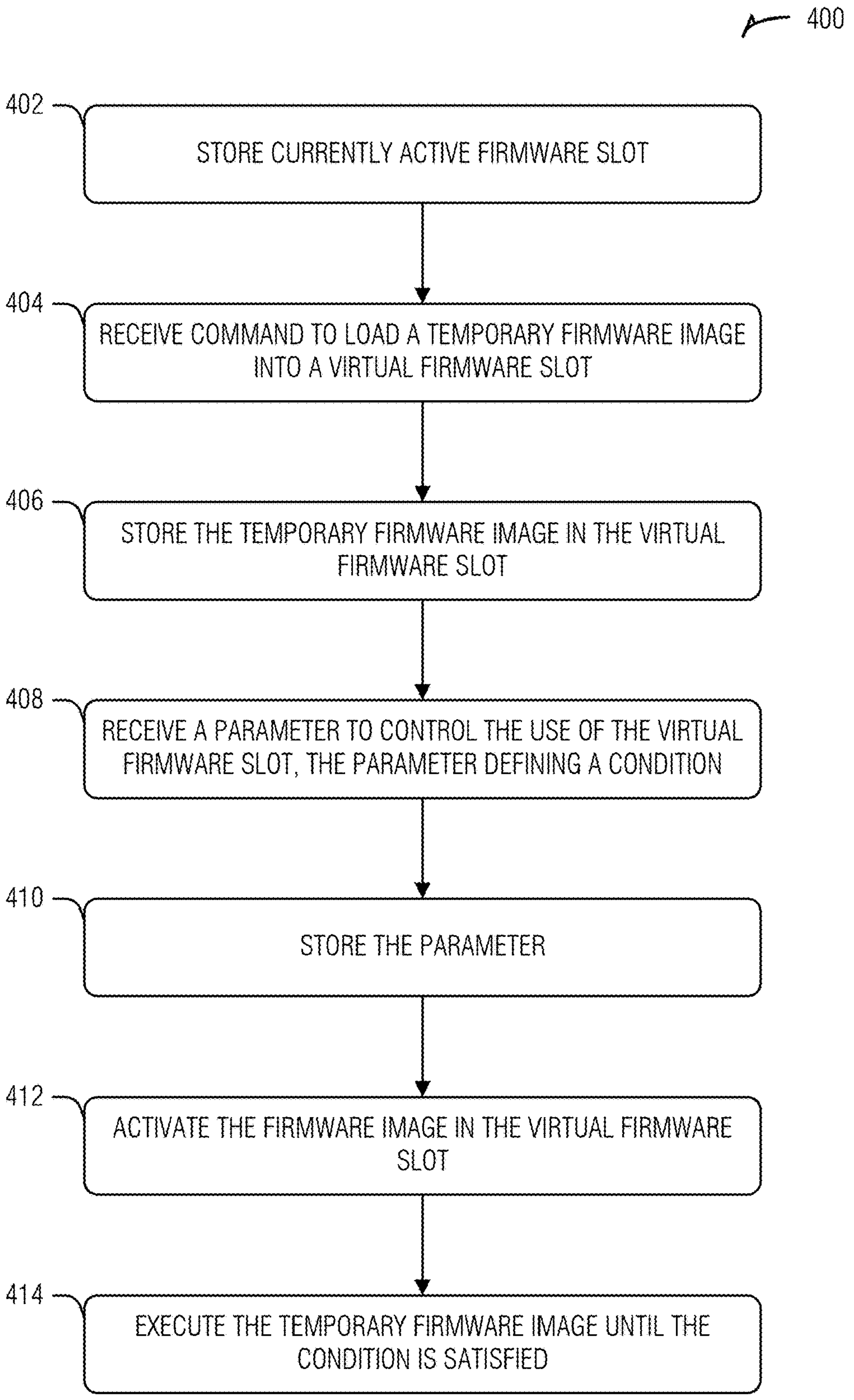
FIG. 4 is a flowchart illustrating an example method for managing firmware programming, according to an embodiment.

FIG. 4 is a flowchart illustrating an example method 400 for managing firmware programming in a device, according to an embodiment. The method 400 can be performed by processing logic that can include hardware (e.g., processing device, circuitry, dedicated logic, programmable logic, microcode, hardware of a device, integrated circuit, etc.). In various embodiments, the method 400 is performed by the controller 102 of FIG. 1 or the hardware processor 502 of FIG. 5.

At operation 402, a currently active firmware slot is stored in a local memory of a device. In an embodiment, the device is a storage device and includes a plurality of memory devices, and the virtual firmware slot is allocated in the plurality of memory devices. In another embodiment, the device is a storage device and includes erasable programmable read-only memory to store firmware images, and the virtual firmware slot is allocated in the erasable programmable read-only memory.

At operation 404, a command to load a temporary firmware image into a virtual firmware slot is received. At operation 406, the temporary firmware image is stored in the virtual firmware slot.

At operation 408, a parameter to control the use of the virtual firmware slot is received. The parameter defines a condition. In an embodiment, the parameter to control the use of the virtual firmware slot includes a number of restarts to use the virtual firmware slot. In a related embodiment, the parameter to control the use of the virtual firmware slot includes a number of reboots to use the virtual firmware slot. In a related embodiment, the parameter to control the use of the virtual firmware slot includes a number of power cycles to use the virtual firmware slot. In a related embodiment, the parameter to control the use of the virtual firmware slot includes a number of reset cycles to use the virtual firmware slot.

At operation 410, the parameter is stored in the local memory. At operation 412, the temporary firmware image in the virtual firmware slot is activated. At operation 414, the temporary firmware image is used until the condition is satisfied. In a further embodiment, the method 400 includes reactivating the currently active firmware slot after the condition is satisfied.

Although shown in a particular sequence or order, unless otherwise specified, the order of the methods or processes described herein can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 5:
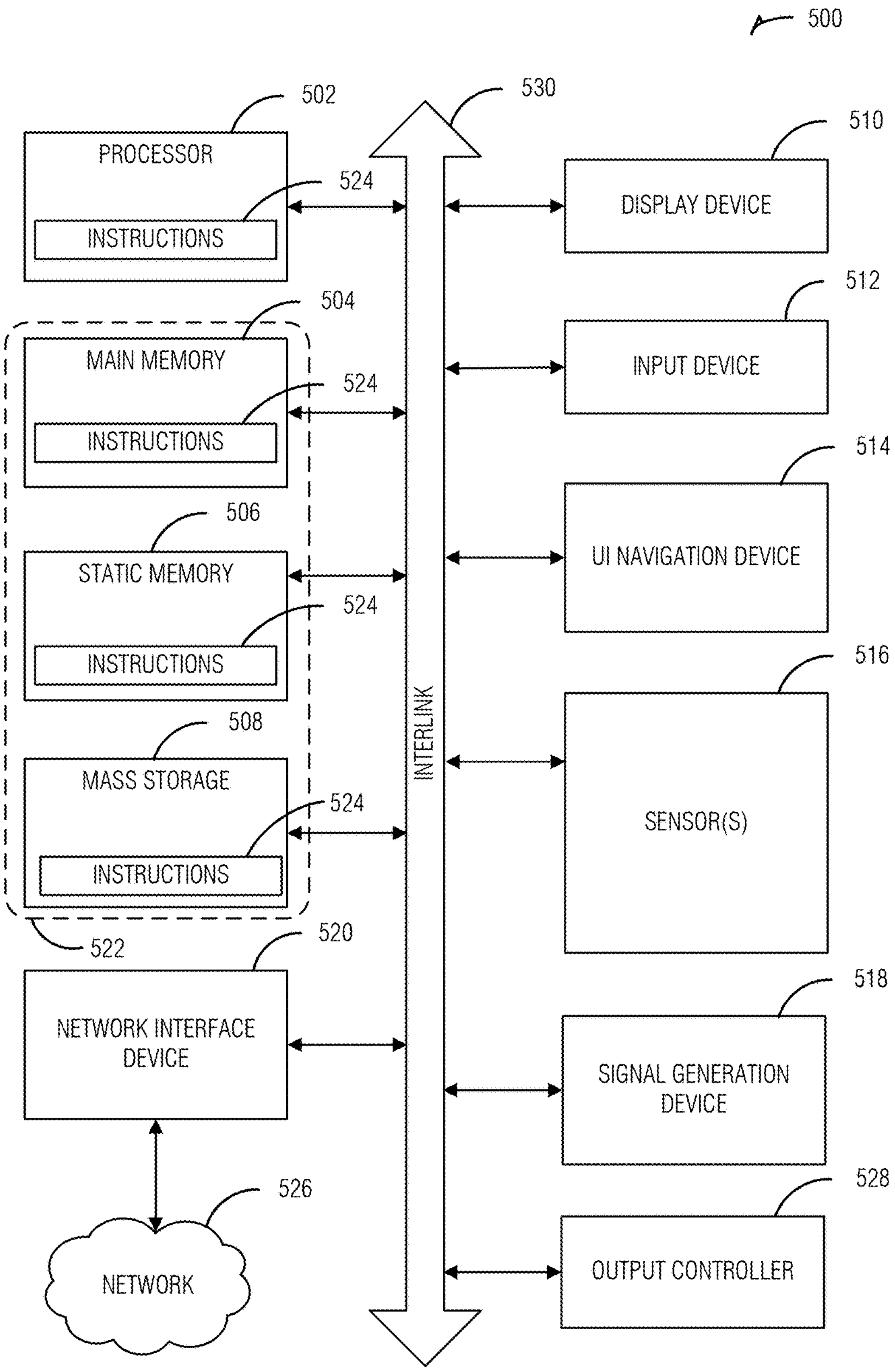
FIG. 5 illustrates a block diagram of an example machine with which, in which, or by which any one or more of the techniques (e.g., methodologies) discussed herein can be implemented.

FIG. 5 illustrates a block diagram of an example machine 500 with which, in which, or by which any one or more of the techniques (e.g., methodologies) discussed herein can be implemented. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 500.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, embedded memory controller, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 500 (e.g., computer system) can include a hardware processor 502 (e.g., a central processing unit (CPU), a graphics processing unit (GPU), a hardware processor core, or any combination thereof), a main memory 504, a static memory 506 (e.g., memory or storage for firmware, microcode, a basic-input-output (BIOS), unified extensible firmware interface (UEFI), etc.), and mass storage device 508 (e.g., hard drives, tape drives, flash storage, or other block devices) some or all of which can communicate with each other via an interlink 530 (e.g., bus). The machine 500 can further include a display device 510, an alphanumeric input device 512 (e.g., a keyboard), and a user interface (UI) Navigation device 514 (e.g., a mouse). In an example, the display device 510, the input device 512, and the UI navigation device 514 can be a touch screen display.

The machine 500 can additionally include a mass storage device 508 (e.g., a drive unit), a signal generation device 518 (e.g., a speaker), a network interface device 520, and one or more sensor(s) 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 502, the main memory 504, the static memory 506, or the mass storage device 508 can be, or include, a machine-readable media 522 on which is stored one or more sets of data structures or instructions 524 (e.g., software) embodying or used by any one or more of the techniques or functions described herein. The instructions 524 can also reside, completely or at least partially, within any of registers of the hardware processor 502, the main memory 504, the static memory 506, or the mass storage device 508 during execution thereof by the machine 500. In an example, one or any combination of the hardware processor 502, the main memory 504, the static memory 506, or the mass storage device 508 can constitute the machine-readable media 522. While the machine-readable media 522 is illustrated as a single medium, the term "machine-readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 522 can be representative of the instructions 524, such as instructions 524 themselves or a format from which the instructions 524 can be derived. This format from which the instructions 524 can be derived can include source code, encoded instructions (e.g., in compressed or encrypted form), packaged instructions (e.g., split into multiple packages), or the like. The information representative of the instructions 524 in the machine-readable media 522 can be processed by processing circuitry into the instructions to implement any of the operations discussed herein. For example, deriving the instructions 524 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 can include assembly, compilation, or interpretation of the information (e.g., by the processing circuitry) to create the instructions 524 from some intermediate or preprocessed format provided by the machine-readable media 522. The information, when provided in multiple parts, can be combined, unpacked, and modified to create the instructions 524. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a device comprising: a controller configured to execute a firmware image; erasable programmable read-only memory to store firmware images; and memory including instructions, which when executed by the controller, cause the controller to: store a currently active firmware slot in a local memory; receive a command to load a temporary firmware image into a virtual firmware slot; store the temporary firmware image into the virtual firmware slot; receive a parameter to control the use of the virtual firmware slot, the parameter defining a condition; store the parameter in the local memory; activate the temporary firmware image in the virtual firmware slot; and use the temporary firmware image until the condition is satisfied.

In Example 2, the subject matter of Example 1 includes, wherein the device is a storage device and includes a plurality of memory devices, and wherein the virtual firmware slot is allocated in the plurality of memory devices.

In Example 3, the subject matter of Examples 1-2 includes, wherein the virtual firmware slot is allocated in the erasable programmable read-only memory.

In Example 4, the subject matter of Examples 1-3 includes, wherein the parameter to control the use of the virtual firmware slot includes a number of restarts to use the virtual firmware slot.

In Example 5, the subject matter of Examples 1~4 includes, wherein the parameter to control the use of the virtual firmware slot includes a number of reboots to use the virtual firmware slot.

In Example 6, the subject matter of Examples 1-5 includes, wherein the parameter to control the use of the virtual firmware slot includes a number of power cycles to use the virtual firmware slot.

In Example 7, the subject matter of Examples 1-6 includes, wherein the parameter to control the use of the virtual firmware slot includes a number of reset cycles to use the virtual firmware slot.

In Example 8, the subject matter of Examples 1-7 includes, wherein the instructions cause the controller to: reactivate the currently active firmware slot after the condition is satisfied.

Example 9 is a method for managing firmware images on a device, the method comprising: storing a currently active firmware slot in a local memory; receiving a command to load a temporary firmware image into a virtual firmware slot; storing the temporary firmware image into the virtual firmware slot; receiving a parameter to control the use of the virtual firmware slot, the parameter defining a condition; storing the parameter in the local memory; activating the temporary firmware image in the virtual firmware slot; and using the temporary firmware image until the condition is satisfied.

In Example 10, the subject matter of Example 9 includes, wherein the device is a storage device and includes a plurality of memory devices, and wherein the virtual firmware slot is allocated in the plurality of memory devices.

In Example 9, the subject matter of Examples 9-10 includes, wherein the device is a storage device and includes erasable programmable read-only memory to store firmware images, and wherein the virtual firmware slot is allocated in the erasable programmable read-only memory.

In Example 12, the subject matter of Examples 9-9 includes, wherein the parameter to control the use of the virtual firmware slot includes a number of restarts to use the virtual firmware slot.

In Example 13, the subject matter of Examples 9-12 includes, wherein the parameter to control the use of the virtual firmware slot includes a number of reboots to use the virtual firmware slot.

In Example 14, the subject matter of Examples 9-13 includes, wherein the parameter to control the use of the virtual firmware slot includes a number of power cycles to use the virtual firmware slot.

In Example 15, the subject matter of Examples 9-14 includes, wherein the parameter to control the use of the virtual firmware slot includes a number of reset cycles to use the virtual firmware slot.

In Example 16, the subject matter of Examples 9-15 includes, reactivating the currently active firmware slot after the condition is satisfied.

Example 17 is a non-transitory machine-readable medium including instructions, which when executed by a machine, cause the machine to: store a currently active firmware slot in a local memory; receive a command to load a temporary firmware image into a virtual firmware slot; store the temporary firmware image into the virtual firmware slot; receive a parameter to control the use of the virtual firmware slot, the parameter defining a condition; store the parameter in the local memory; activate the temporary firmware image in the virtual firmware slot; and use the temporary firmware image until the condition is satisfied.

In Example 18, the subject matter of Example 17 includes, wherein the machine is a storage device and includes a plurality of memory devices, and wherein the virtual firmware slot is allocated in the plurality of memory devices.

In Example 19, the subject matter of Examples 17-18 includes, wherein the machine includes an erasable programmable read-only memory to store firmware images, and wherein the virtual firmware slot is allocated in the erasable programmable read-only memory.

In Example 20, the subject matter of Examples 17-19 includes, wherein the parameter to control the use of the virtual firmware slot includes a number of restarts to use the virtual firmware slot.

In Example 17, the subject matter of Examples 17-20 includes, wherein the parameter to control the use of the virtual firmware slot includes a number of reboots to use the virtual firmware slot.

In Example 22, the subject matter of Examples 17-17 includes, wherein the parameter to control the use of the virtual firmware slot includes a number of power cycles to use the virtual firmware slot.

In Example 23, the subject matter of Examples 17-22 includes, wherein the parameter to control the use of the virtual firmware slot includes a number of reset cycles to use the virtual firmware slot.

In Example 24, the subject matter of Examples 17-23 includes, wherein the instructions cause the machine to: reactivate the currently active firmware slot after the condition is satisfied.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device comprising:

a controller configured to execute a firmware image;

erasable programmable read-only memory to store firmware images; and memory including instructions, which when executed by the controller, cause the controller to:

store a temporary firmware image into a firmware memory, the temporary firmware image to be used in place of a current firmware image;

receive a parameter to control the use of the temporary firmware image, the parameter defining a condition;

store the parameter in the local memory;

activate the temporary firmware image in the virtual firmware slot; and use the temporary firmware image until the condition is satisfied, and then revert to the current firmware image.

2. The device of claim 1, wherein the device is a storage device and includes memory modules, and wherein the firmware memory is allocated in the memory modules.

3. The device of claim 1, wherein the firmware memory slot is allocated in the erasable programmable read-only memory.

4. The device of claim 1, wherein the parameter to control the use of the temporary firmware image includes a number of restarts, reboots, or power cycles to use the temporary firmware image.

5. A device comprising:

a controller configured to execute a firmware image;

erasable programmable read-only memory to store firmware images; and memory including instructions, which when executed by the controller, cause the controller to:

store a currently active firmware slot in a local memory;

receive a command to load a temporary firmware image into a virtual firmware slot;

store the temporary firmware image into the virtual firmware slot;

receive a parameter to control the use of the virtual firmware slot, the parameter defining a condition;

store the parameter in the local memory;

activate the temporary firmware image in the virtual firmware slot; and use the temporary firmware image until the condition is satisfied.

6. The device of claim 5, wherein the device is a storage device and includes a plurality of memory devices, and wherein the virtual firmware slot is allocated in the plurality of memory devices.

7. The device of claim 5, wherein the virtual firmware slot is allocated in the erasable programmable read-only memory.

8. The device of claim 5, wherein the parameter to control the use of the virtual firmware slot includes a number of restarts to use the virtual firmware slot.

9. The device of claim 5, wherein the parameter to control the use of the virtual firmware slot includes a number of reboots to use the virtual firmware slot.

10. The device of claim 5, wherein the parameter to control the use of the virtual firmware slot includes a number of power cycles to use the virtual firmware slot.

11. The device of claim 5, wherein the parameter to control the use of the virtual firmware slot includes a number of reset cycles to use the virtual firmware slot.

12. The device of claim 5, wherein the instructions cause the controller to:

reactivate the currently active firmware slot after the condition is satisfied.

13. A method for managing firmware images on a device, the method comprising:

storing a currently active firmware slot in a local memory;

receiving a command to load a temporary firmware image into a virtual firmware slot;

storing the temporary firmware image into the virtual firmware slot;

receiving a parameter to control the use of the virtual firmware slot, the parameter defining a condition;

storing the parameter in the local memory;

activating the temporary firmware image in the virtual firmware slot; and using the temporary firmware image until the condition is satisfied.

14. The method of claim 13, wherein the device is a storage device and includes a plurality of memory devices, and wherein the virtual firmware slot is allocated in the plurality of memory devices.

15. The method of claim 13, wherein the device is a storage device and includes erasable programmable read-only memory to store firmware images, and wherein the virtual firmware slot is allocated in the erasable programmable read-only memory.

16. The method of claim 13, wherein the parameter to control the use of the virtual firmware slot includes a number of restarts to use the virtual firmware slot.

17. The method of claim 13, wherein the parameter to control the use of the virtual firmware slot includes a number of reboots to use the virtual firmware slot.

18. The method of claim 13, wherein the parameter to control the use of the virtual firmware slot includes a number of power cycles to use the virtual firmware slot.

19. The method of claim 13, wherein the parameter to control the use of the virtual firmware slot includes a number of reset cycles to use the virtual firmware slot.

20. The method of claim 13, comprising reactivating the currently active firmware slot after the condition is satisfied.

* * * * *